United States Patent [19]

Ghahary

[11] Patent Number: 5,465,544
[45] Date of Patent: Nov. 14, 1995

[54] DECORATIVE FACINGS FOR BRICKS, CINDERBLOCKS AND THE LIKE

[75] Inventor: Akbar Ghahary, Ringwood, N.J.

[73] Assignee: Safas Corporation, Clifton, N.J.

[21] Appl. No.: 35,720

[22] Filed: Mar. 23, 1993

[51] Int. Cl.⁶ .............................. E04F 13/00; B44D 5/00
[52] U.S. Cl. ...................... 52/311.1; 52/596; 52/DIG. 7; 156/61
[58] Field of Search .................... 52/311.1, 596, 52/DIG. 7; 156/61, 293; 428/15

[56] References Cited

U.S. PATENT DOCUMENTS

| | | | |
|---|---|---|---|
| 134,300 | 12/1872 | Mellen | 52/311.1 |
| 646,589 | 4/1900 | Webb | 52/596 |
| 756,971 | 4/1904 | Leighton | 52/596 |
| 772,476 | 10/1904 | Podmore | 52/596 |
| 776,441 | 11/1904 | Veyon | 52/596 |
| 1,659,962 | 2/1928 | Schaeffer | 52/311.1 |
| 2,040,863 | 5/1936 | MacDonald et al. | 52/311.1 X |
| 2,216,813 | 10/1940 | Goldschmidt | 52/596 |
| 2,751,775 | 6/1956 | Sergovic | 52/596 |
| 2,805,448 | 10/1957 | Rubenstein | 52/DIG. 7 X |
| 2,817,619 | 12/1957 | Bickel et al. | 52/596 |
| 2,951,001 | 8/1960 | Rubenstein | 52/311.1 X |
| 3,194,724 | 7/1965 | Sergovic | 52/596 |

FOREIGN PATENT DOCUMENTS

| | | | |
|---|---|---|---|
| 1306874 | 9/1962 | France | 52/311.1 |
| 10850 | of 1909 | United Kingdom | 52/596 |

OTHER PUBLICATIONS

"Marble Surface", p. 183, *Modern Plastics* Magazine, May 1954.

Primary Examiner—Carl D. Friedman
Assistant Examiner—Kevin D. Wilkens
Attorney, Agent, or Firm—Lieberman & Nowak

[57] ABSTRACT

A decorative facing can be placed on a block so as to render an ordinary block decorative. This provides the advantage of reducing transportation costs, since locally produced construction blocks can be used in place of the glazed blocks produced at a relatively limited number of facilities. The facing in addition to being decorative enhances the water impermeability of the block and facilitates clean-up.

3 Claims, 2 Drawing Sheets

DECORATIVE FACINGS FOR BRICKS, CINDERBLOCKS AND THE LIKE

BACKGROUND OF THE INVENTION

The subject invention relates to decorative facings for bricks, cinderblocks and the like.

Bricks and cinderblocks are used in many structural applications in which they remain visible to the passerby. Although the look of unfinished brick is appropriate to many settings, it is oftentimes desirable to mask or decorate the brick or cinderblock in some manner. To this effect, it has been common practice to glaze bricks and cinderblock so as to provide an aesthetically appealing display. Unfortunately, facilities for producing these surfaces are not available in many localities. Thus, if such a finished block is desired, the weighty block must be transported from a distant manufacturing facility. This transportation increases costs and subjects the environment to increased pollution from the methods of transport, e.g. truck exhaust.

The subject invention remedies this problem by providing a lightweight veneer which slips over the front of a brick or cinderblock. Being lightweight, the facing veneer is readily transportable. Thus, transport of blocks from a distant point to a building site is relatively inexpensive and less environmentally harmful than transporting entire blocks. Either at the construction site, or the local block manufacturer, the facings can be affixed to the blocks.

Another problem with structural blocks is that they tend to be porous. Porosity allows water and impurities to enter a block making the block suseptable to weathering and making cleaning difficult. The decorative facing of the subject invention, especially when made from the materials described in co-pending patent application, Ser. No. 07/882,839, are easily cleaned and have remarkable impact strength.

It is therefore an object of this invention to provide a decorative facing for use on structural blocks. It is also an object to provide a low cost alternative to glazing and introduce an affordable decorative and protective cap for structural blocks.

In summary, the subject facings provide improvements over known decorative methods for bricks, cinderblocks and the like.

SUMMARY OF THE INVENTION

The invention provides a decorative facing for use on a block. This comprises a sheet of material having dimensions marginally larger than the face of the block to be covered and a lip which extends beyond the edges of the sheet of material. The lip is formed so as to cover the portion of the block adjacent the face. Preferably, the facing is formed from a plastic or resin, and is oftentimes reinforced with fiberglass.

The decorative facing may further comprise means for affixing the decorative facing to the block, such as by using an adhesive.

The invention also provides a method of producing a decorative block. This involves (i) selecting a block having a face portion, side portions adjacent to the face portion and a back portion, (ii) providing a decorative facing having a face portion with dimensions marginally exceeding the dimensions of the face portion of the block and having lip portions adjacent to the face portion which are configured so as to juxtapose the sides of the block when the face portion of the decorative facing is placed in contact with the face portion of the block, and (iii) affixing the decorative facing to the block.

Typically, the affixing comprises contacting the decorative facing with the block so that the lip portions of the decorative facing are lodged against the sides of the block. This is often accomplished by adhering the decorative facing to the block. Adhering generally involves applying an adhesive.

DETAILED DESCRIPTION OF THE INVENTION

The subject invention will now be described in terms of its preferred embodiments. These embodiments are set forth to aid in better understanding the subject application, but are not to be construed as limiting.

In general, the subject invention relates to a facing which can be used on bricks, cinderblocks or the like. The facing typically defines an area marginally larger than the exposed face of the block onto which it is to be placed. Throughout this application, the term "block" will be used. The term block is to encompass blocks of any shape or dimension (such as bricks and cinderblocks), and is to include blocks made of any material, including, but not limited to, masonry, plaster, wood, stone, clay, plastic and resin.

The facings of the subject invention may be formed of any suitable material. Typically these materials include plastics, fiberglass, glass reinforced resins, and the like. Suitable resin compositions have been described in applicant's earlier applications, U.S. Ser. No. 07/788,982, filed Nov. 7, 1991, now abandoned and U.S. Ser. No. 07/882,839, filed May 14, 1992 now U.S. Pat. No. 5,304,592, the contents of both are herein incorporated by reference. The facings may be formed using any technology, however, it is preferred that they be formed by compression molding a plastic material. Compression molding offers the advantage of providing a thin material have uniform thickness. Other suitable molding includes vacuum molding and open molding.

Preferred plastic compositions employed in forming the facing of the present invention are the acrylic resins disclosed in my U.S. Pat. No. 5,304,592. These resins contain additional resins particulates which can be thermoset or thermoplastic, but are in either event immiscible with the acrylic resin matrix. The resin particulates are employed in a size range of 14 to 100 U.S. mesh size, and in a concentration of 2% to 50% to provide a mineral and, more specifically, a granite like appearance to articles, such as the facings of the present invention. As described in my patent, other additives can be included in the composite.

Figure 1:
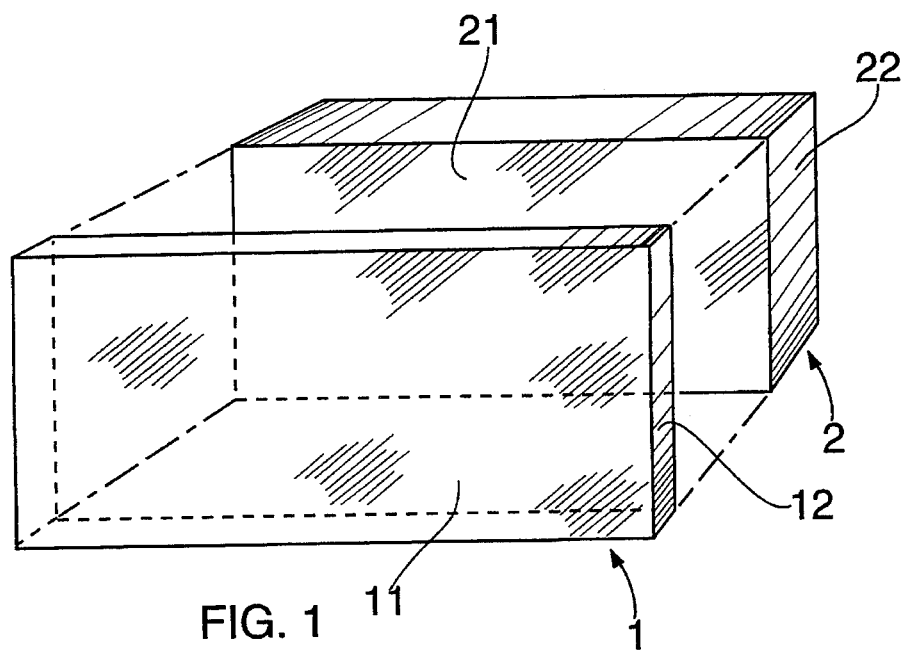
FIG. 1 shows a perspective view of the facing being inserted onto the face of a brick.
Figure 2:
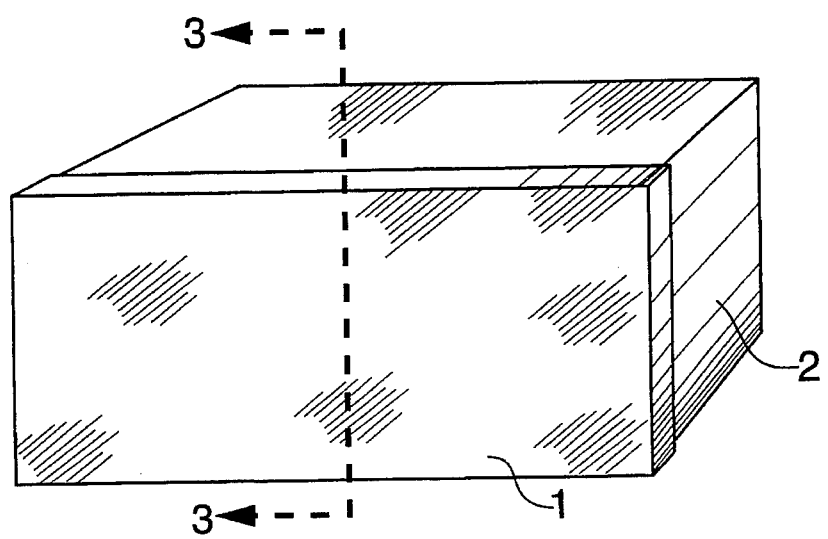
FIG. 2 shows a perspective view of the facing installed on a brick.

Referring now to the figures, FIG. 1 shows the general concept of the subject invention, i.e. how the decorative facing acts as a cap to enclose the exposed surface of a block. Facing 1 is placed upon block 2 as illustrated. Facing 1 includes a sheet of material 11 which is juxtaposed against the face 21 of block 2. Adjacent to sheet 11 are lips 12 which contact sides 22 of block 2. Sheet 11 is of marginally larger dimension than face 21. The shape of both sheet 11 and face 21 may be of any configuration, for example, rectangular (as depicted), square, circular, diamond shaped, star shaped, etc. Lip 12 generally conforms to side 22. Preferably, this interaction is at a close enough tolerance so that the frictional force between facing 1 and block 2 is sufficient to hold facing 1 in place. If desired an adhesive covering the whole or part of the facing of the block or the internal surface of the facing is applied before the compression molded facing is attached to the block.

Figure 3:
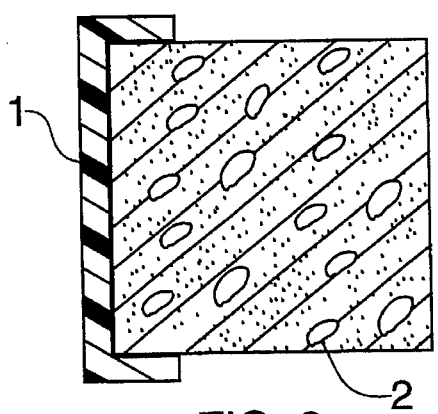
FIG. 3 shows a cross-sectional view taken along plane 3—3.
Figure 4:
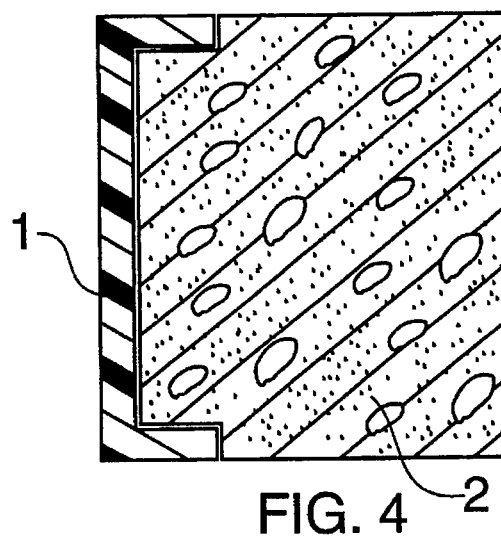
FIG. 4 shows a cross-sectional view of a brick having a modified surface so that the facing when attached to the brick causes the brick to be geometrically symmetrical in appearance.
Figure 5:
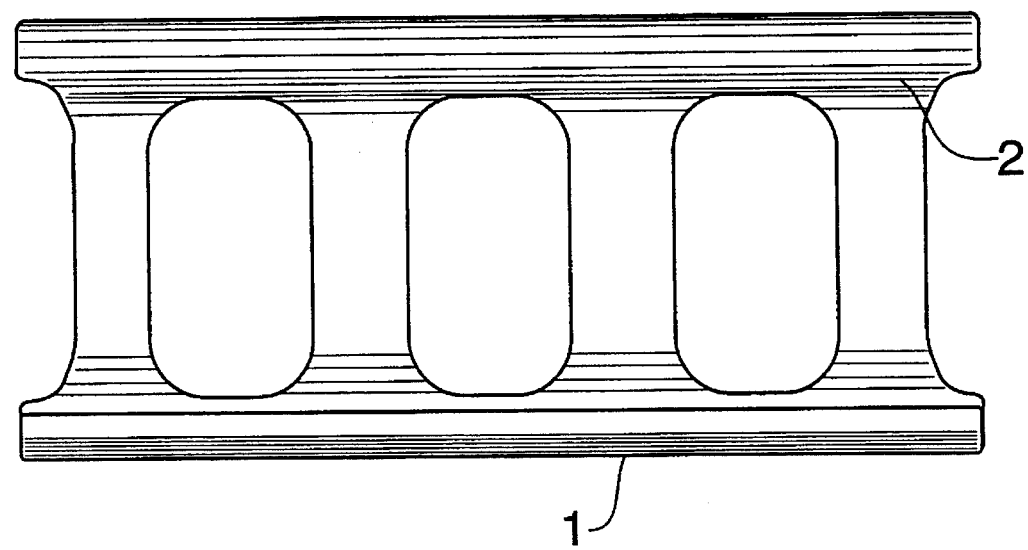
FIG. 5 shows a top view of a cinderblock having the facing mounted thereto.

Facing 1 may be affixed to block 2 by any known means. Although, in some instances, facing 1 is constructed so that friction between block 2 and facing 1 is sufficient to hold the facing in place, under typical circumstances facing 1 will be glued using a suitable adhesive to face 21. FIG. 3 shows such adhesive layer (31) between the block and the facing.

Through the use of applicant's earlier described compositions, it is possible to make common structural blocks mimic the appearance of fine marble and granite.

Upon reading the subject application, various alternative embodiments will become obvious to those skilled in the art. These variations are to be considered within the scope and spirit of the subject invention, which is only to be limited by the claims which follow and their equivalents.

What is claimed is:

1. A decorative facing for use on a block, which comprises a sheet of material having dimensions marginally larger than the face of the block to be covered and a lip which extends beyond the edges of the sheet of material, the lip being formed so as to cover the portion of the block adjacent the face said facing comprising a composite of an acrylic resin containing from 2% to 50% of a particulate filler in a 14 to 100 U.S. mesh size and obtained by separate compression molding.

2. A decorative facing of claim 1 further comprising means for affixing the decorative facing to the block.

3. A decorative facing of claim 2, wherein the means for affixing the decorative facing comprise an adhesive.

* * * * *